United States Patent [19]

Ikari

[11] Patent Number: 5,127,227
[45] Date of Patent: Jul. 7, 1992

[54] HYDRAULIC CIRCUIT APPARATUS FOR CONSTRUCTION VEHICLES

[75] Inventor: Masanori Ikari, Saitama, Japan

[73] Assignee: Kabushiki Kaisha Komatsu Seisakusho, Japan

[21] Appl. No.: 460,060

[22] PCT Filed: May 16, 1989

[86] PCT No.: PCT/JP89/00496
§ 371 Date: Mar. 14, 1990
§ 102(e) Date: Mar. 14, 1990

[87] PCT Pub. No.: WO89/11411
PCT Pub. Date: Nov. 30, 1989

[30] Foreign Application Priority Data
May 16, 1988 [JP] Japan .............. 63-63420[U]

[51] Int. Cl.⁵ .............................. F16D 31/02
[52] U.S. Cl. .......................... 60/421; 60/430
[58] Field of Search ............ 60/421, 427, 428, 430, 60/426

[56] References Cited

U.S. PATENT DOCUMENTS

| | | | |
|---|---|---|---|
| 3,720,059 | 3/1973 | Schurowski et al. | 60/421 |
| 3,868,821 | 3/1975 | Ratliff et al. | 60/421 |
| 3,916,624 | 11/1975 | Machens et al. | 60/428 |
| 3,975,909 | 8/1976 | McBurnett | 60/430 |
| 3,987,623 | 10/1976 | Bianchetta | 60/427 |
| 4,030,623 | 6/1977 | Bridwell et al. | 60/421 |
| 4,461,148 | 7/1984 | Krusche | 60/421 |
| 4,864,822 | 9/1989 | Wachs et al. | 60/427 |

FOREIGN PATENT DOCUMENTS

| | | |
|---|---|---|
| 2418358 | 9/1979 | France . |
| 56-14118 | 2/1981 | Japan . |
| 58-45297 | 3/1983 | Japan . |
| 1373902 | 11/1974 | United Kingdom . |

Primary Examiner—Edward K. Look
Assistant Examiner—F. Daniel Lopez
Attorney, Agent, or Firm—Ronald P. Kananen

[57] ABSTRACT

A hydraulic circuit apparatus for use in construction vehicles which is arranged to reduce pressure losses that occur when all the implement operating valves are kept at their neutral positions, to reduce the power consumption by all hydraulic pumps when the hydraulic circuit for implements require only a small amount of pressurized fluid, and to transmit a command signal to unload the surplus pressurized fluid when occasion demands. The circuit comprises a surplus pressurized fluid control circuit (50) to facilitate the regulation of changes in the fluid flow rate when changing over valves. The surplus pressurized fluid control circuit (50) has a pilot actuated type unloading valve (11) provided in a surplus pressurized fluid supply conduit (51) which is connected through a check valve 20 to a hydraulic pump ($P_1$). The hydraulic pump ($P_1$) is for the exclusive use of the implement. The conduit (51) is also connected to a drain conduit (Ct). A pilot pressure change-over valve (12) is provided in a pilot conduit (19) for the unloading valve (11).

4 Claims, 6 Drawing Sheets

FIG. 5

| NO | Ⅰ | Ⅱ | Ⅲ |
|---|---|---|---|
| (1) | Ⅰ-(1) | Ⅱ-(1) | Ⅲ-(1) |
| (2) | Ⅰ-(2) | Ⅱ-(2) | Ⅲ-(2) |
| (3) | Ⅰ-(3) | Ⅱ-($3_1$) | Ⅲ-($3_1$) |
|     |       | Ⅱ-($3_2$) | Ⅲ-($3_2$) |

Ⅰ FLOW RATE REQUIRED FOR HYDRAULIC CIRCUIT FOR WORK-IMPLEMENTS
  Ⅰ-(1) (AT THE TIME WHEN WORK-IMPLEMENT OPERATING VALVES 7, 8 ARE ALL LOCATED IN THEIR RESPECTIVE NEUTRAL POSITIONS)
  Ⅰ-(2) AT THE TIME WHEN FLOW RATE OF PUMP $P_1$ IS SUFFICIENT
  Ⅰ-(3) AT THE TIME WHEN FLOW RATE OF PUMP $P_1$ IS INSUFFICIENT
Ⅱ HYDRAULIC PRESSURE WITHIN HYDRAULIC CIRCUIT FOR WORK-IMPLEMENTS
  Ⅱ-(1) LOW PRESSURE
  Ⅱ-(2) LOW PRESSURE → HIGH PRESSURE
  Ⅱ-($3_1$) NORMAL PRESSURE
  Ⅱ-($3_2$) HIGH PRESSURE
Ⅲ OPERATION OF UNLOADING VALVE 11
  Ⅲ-(1) TO UNLOAD SURPLUS FLOW RATE IN HYDRAULIC CIRCUIT FOR POWER STEERING (TO DRAIN TO TANK T)
  Ⅲ-(2) DITTO
  Ⅲ-($3_1$) TO MAKE A PARTIAL FLOW INTO HYDRAULIC CIRCUIT FOR WORK-IMPLEMENTS AT AN AMOUNT INSUFFICIENT IN FLOW RATE OF PUMP $P_1$
  Ⅲ-($3_2$) TO UNLOAD SURPLUS FLOW RATE IN HYDRAULIC CIRCUIT FOR POWER STEERING (TO DRAIN TO TANK T)

HYDRAULIC CIRCUIT APPARATUS FOR CONSTRUCTION VEHICLES

TECHNICAL FIELD OF THE INVENTION

This invention relates to a hydraulic circuit apparatus for use in construction vehicles provided with a hydraulic circuit for power steering and a hydraulic circuit for implements and, more particularly, to a hydraulic circuit apparatus for construction vehicles arranged such that pressurized fluid in an amount more than that required for power steering is allowed to join the fluid flow to be supplied into the hydraulic circuit for implements thereby increasing the operating speed of the implements.

BACKGROUND ART OF THE INVENTION

One embodiment of a prior art hydraulic circuit apparatus for use in construction vehicles is shown in FIG. 1.

As shown in FIG. 1, this hydraulic circuit apparatus comprises a plurality of hydraulic pumps $P_1$, $P_2$ and $P_3$ for supplying pressurized fluid, and a flow control valve 6 which serves to allow the pressurized fluid in an excess amount than that required for a hydraulic circuit 5 for power steering to join the fluid flow through a hydraulic circuit A for implements. Reference characters c and d denote valves for operating the implements and are adapted for controlling the supply of pressurized fluid to hydraulic cylinders 22 and 23 for actuating the implements. Reference character e denotes a main relief valve, and T reference character a fluid tank or reservoir.

To improve the maneuverability of the implements in the above-mentioned prior art hydraulic circuit apparatus shown in FIG. 1, there is a conventional hydraulic circuit B for implements as shown in FIG. 2. The hydraulic circuit B comprises, in addition to the hydraulic circuit A for implements shown in FIG. 1, implement operating valves 7 and 8 and pressure compensating flow control valves 9 and 10 associated, respectively, therewith. In FIG. 2, reference numerals 9' and 10' indicate springs and numerals 15, 16, 17 and 18 indicate pilot pipings.

Further, in the case where the hydraulic circuit for implements is kept at a high pressure and large quantities of pressurized fluid is not required for the hydraulic circuit for implements, a prior art arrangement as shown in FIG. 3 is used. An unloading valve c is used to unload the pressurized fluid in excess of that required for the hydraulic circuit 5 for power steering upstream of the hydraulic circuit for implements A and B. This thereby reduces the power consumption for the latter.

In the case where the above-mentioned prior techniques are used, the problems are as follows.

(1) In the case where the pressure compensating flow control valves 9 and 10 are additionally provided as shown in FIG. 2, when the hydraulic circuit for implements is at its neutral position (stating more specifically, the implement operating valves 7 and 8 assume their positions $7_2$ and $8_2$, respectively), it is required to provide a fluid actuating pressure which can overcome the resilient forces of the springs 9' and 10' in the pressure compensating flow control valves 9 and 10, respectively. This fluid pressure is produced in the pilot pipings 15, 17, thus causing pressure losses corresponding to the fluid actuating pressure.

(2) In the above-mentioned prior art hydraulic circuit apparatuses shown in the FIGS. 1 and 2, in case where the flow rate of fluid under pressure delivered by the hydraulic pump $P_1$ meets the requirements of the hydraulic circuit A or B for implements, the pressurized fluid in an excess amount or a flow rate than that supplied into the hydraulic circuit 5 for power steering becomes useless. The fluid pressure for the hydraulic circuit for implements becomes loaded on the hydraulic pump $P_2$ or $P_3$, thus causing a high power consumption for the latter.

(3) In the above-mentioned prior art hydraulic circuit apparatuses shown in FIGS. 1, 2 and 3, because of a high rate of fluid flow through the implement operating valves (c, d in FIG. 1, and 7, 8 in FIG. 3), there is a tendency of causing a rise in fluid temperature and generating noise due to the fluid pressure.

SUMMARY OF THE INVENTION

The present invention has been made in view of the above-mentioned circumstances in the prior art, and has an object to provide a hydraulic circuit apparatus for use in construction vehicles wherein when a plurality of implement operating valves are all kept at their neutral positions the excess pressurized fluid in an amount more than that required for a hydraulic circuit for power steering is not allowed to flow into a hydraulic circuit for implements. This enables power losses at the neutral positions of the valves to be reduced.

Another object of the present invention is to provide a hydraulic circuit apparatus for use in construction vehicles wherein when the hydraulic circuit for implements requires only a small amount of pressurized fluid only the pressurized fluid delivered by one of the plurality of pumps is allowed into the hydraulic circuit for implements. This enables power consumption by all the hydraulic pumps to be reduced.

A further object of the present invention is to provide a hydraulic circuit apparatus for use in construction wherein the pressurized fluid in excess of that required in the hydraulic circuit for steering is unloaded when the hydraulic circuit for implements is kept at a high pressure. An unloading command can be selected freely and changes in the flow rate of fluid under pressure which occur when changing over the unloading valve can be regulated readily.

To achieve the above-mentioned objects, according to a first aspect of the present invention, there is provided a hydraulic circuit apparatus for construction vehicles including a hydraulic circuit for power steering and a hydraulic circuit for work implements having at least two hydraulic actuators. The arrangement is made such that the fluid under pressure in excess of that required in the hydraulic circuit for power steering is allowed to join the fluid in the hydraulic circuit for implements. The invention is generally characterized in that the hydraulic circuit apparatus comprises a plurality of pressure compensating flow control valves adapted to control the flow rate of the pressurized fluid supplied into a plurality of implement operating valves, respectively, of the hydraulic circuit for work implements. A pilot actuated type unloading valve is adapted to control the flow rate of the pressurized fluid at the time when the remainder of pressurized fluid supplied into the hydraulic circuit for power steering is supplied into the hydraulic circuit for implements.

To achieve the above-mentioned objects, according to a second aspect of the present invention, there is provided a hydraulic circuit apparatus for use in construction vehicles as set forth in the first aspect. The invention is generally characterized in that a pilot pressure change-over piping is provided in a pilot piping connected to the pilot actuated type unloading valve adapted to control the flow rate of the pressurized fluid at the time when the remainder of pressurized fluid to be supplied into the power steering hydraulic circuit is supplied into the implements hydraulic circuit. The hydraulic pressure within the pilot piping is changed over so as to unload the pilot actuated type unloading valve when the hydraulic pressure within the pilot piping exceeds a preset value.

The present invention incorporating the above-mentioned aspect has the following advantages.

(1) When all the implement operating valves are kept at their neutral positions the surplus pressurized fluid in the power steering hydraulic circuit is not allowed to flow into the implements hydraulic circuit. The fluid flow through the implement operating valves is reduced to thereby enable pressure losses at the neutral position to be reduced.

(2) When the implements hydraulic circuit requires only a small amount of pressurized fluid under pressure only the pressurized fluid delivered by one of the plurality of pumps is supplied and the power consumption by the hydraulic pumps can be reduced.

(3) In the case where the surplus pressurized fluid in the power steering hydraulic circuit is unloaded when the implements hydraulic circuit is kept at a high pressure the change-over of the pilot actuated type unloading valve is performed by means of the pilot pressure change-over valve, an unloading command can be selected freely and changes in the flow rate of fluid under pressure which occur when changing over the unloading valve can be regulated freely.

The above-mentioned objects, aspects and advantages of the present invention will become apparent to those skilled in the art by making reference to the following detailed description and the accompanying drawings in which preferred embodiments incorporating the principles of the present invention are shown by way of examples only.

BRIEF DESCRIPTION OF THE DRAWINGS

FIG. 5 is a table which summarizes operating conditions of the embodiment shown in FIG. 1.

DETAILED DESCRIPTION OF PREFERRED EMBODIMENTS

The present invention will now be described below by way of examples only with reference to FIGS. 4 to 6.

Figure 1:
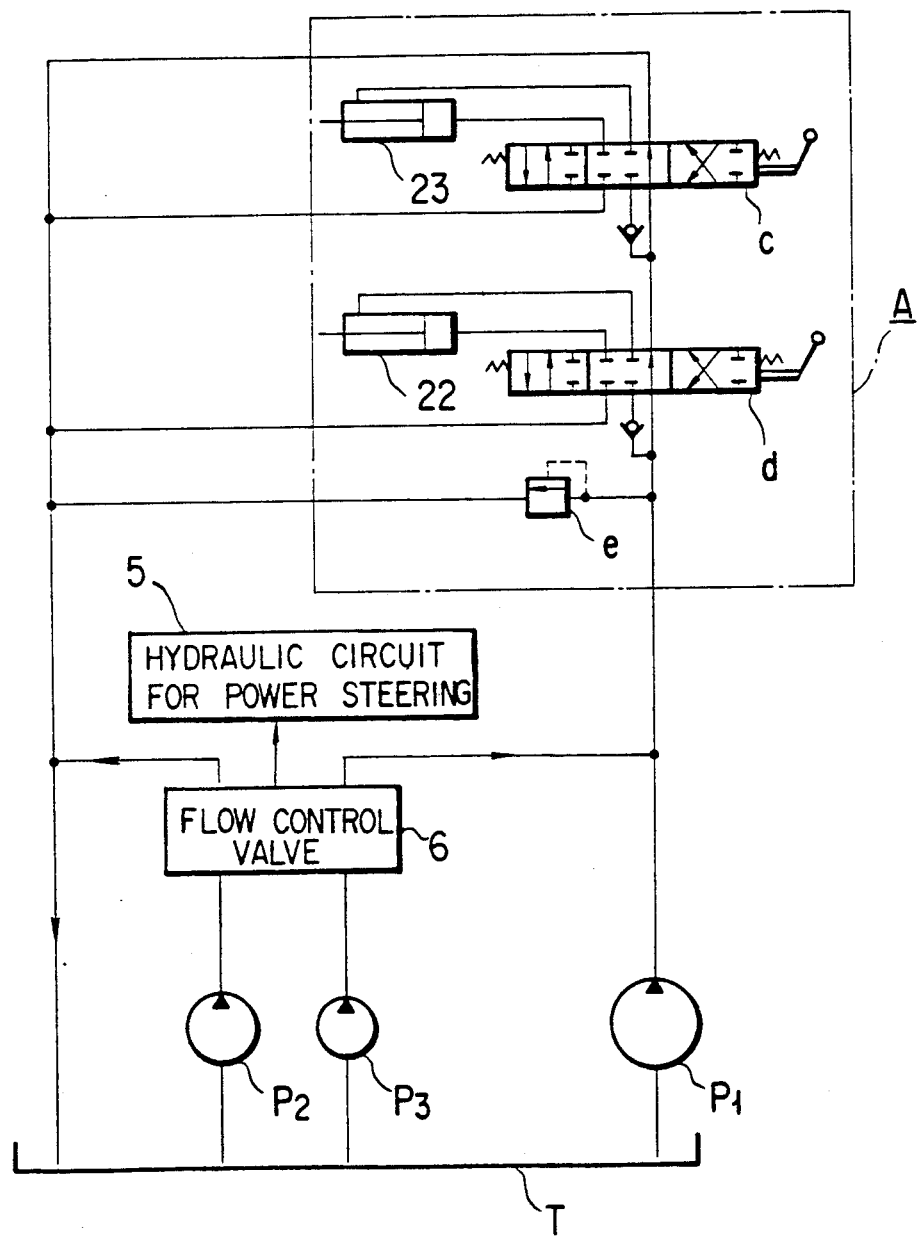
FIGS. 1, 2 and 3 are schematic explanatory views showing the constructions of prior art hydraulic circuit apparatuses for use in construction vehicles.
Figure 2:
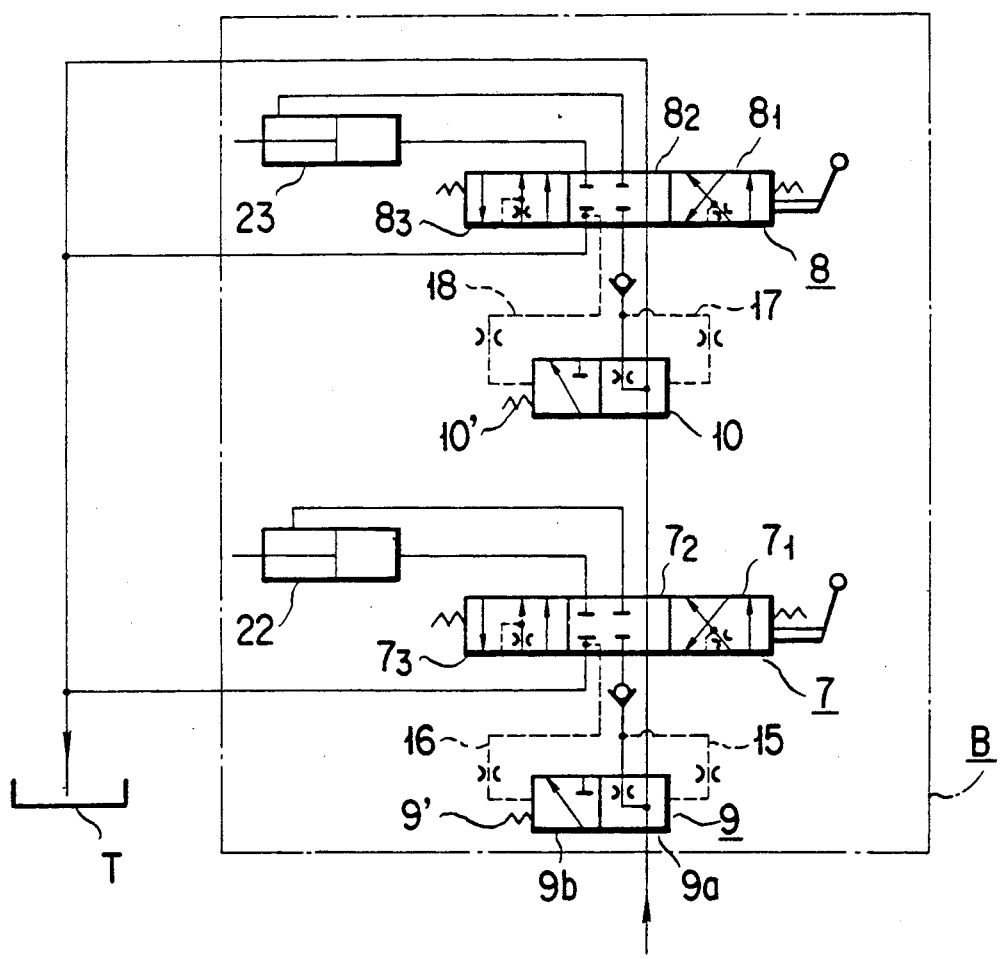
Figure 3:
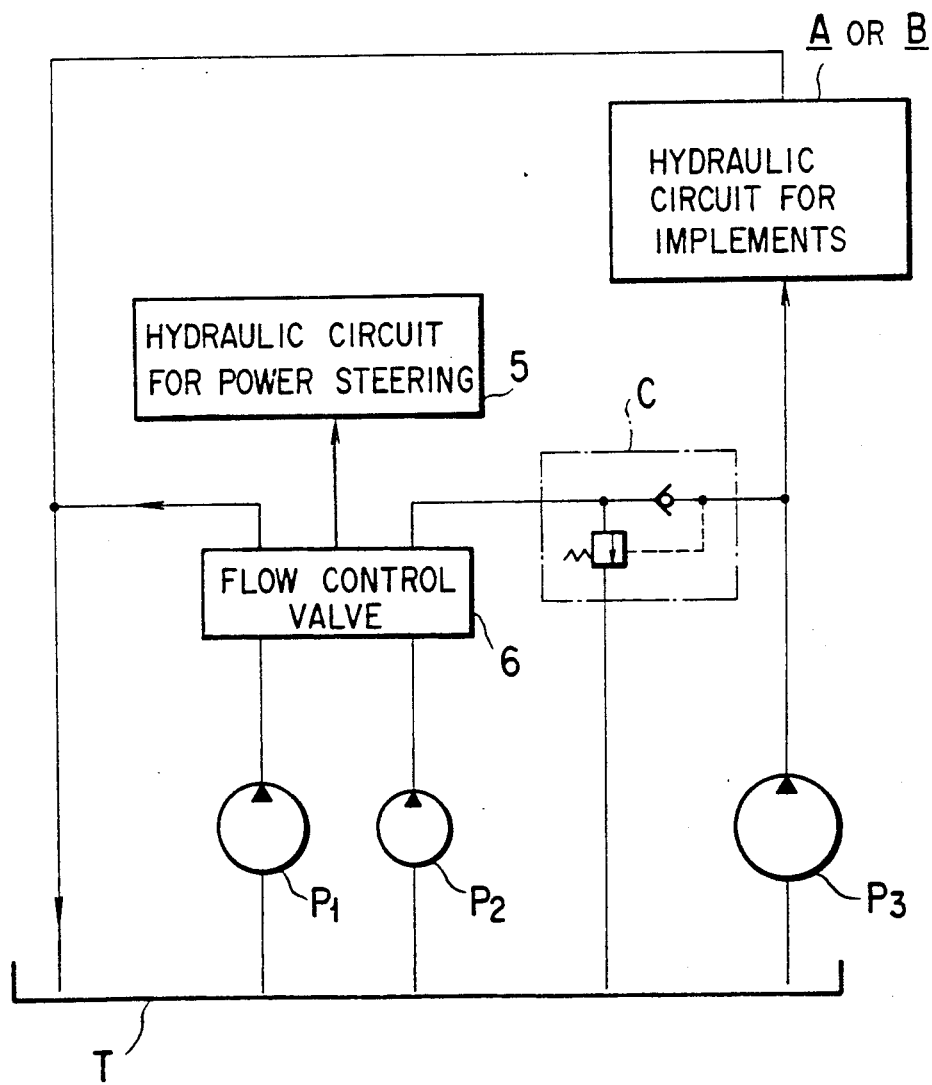

In these drawings, the component parts having the same functions as those of the component parts of the prior art hydraulic circuit apparatuses shown in FIGS. 1 to 3 are indicated with the same reference numerals. Further description of them is omitted herein to avoid duplication of explanations.

Figure 4:
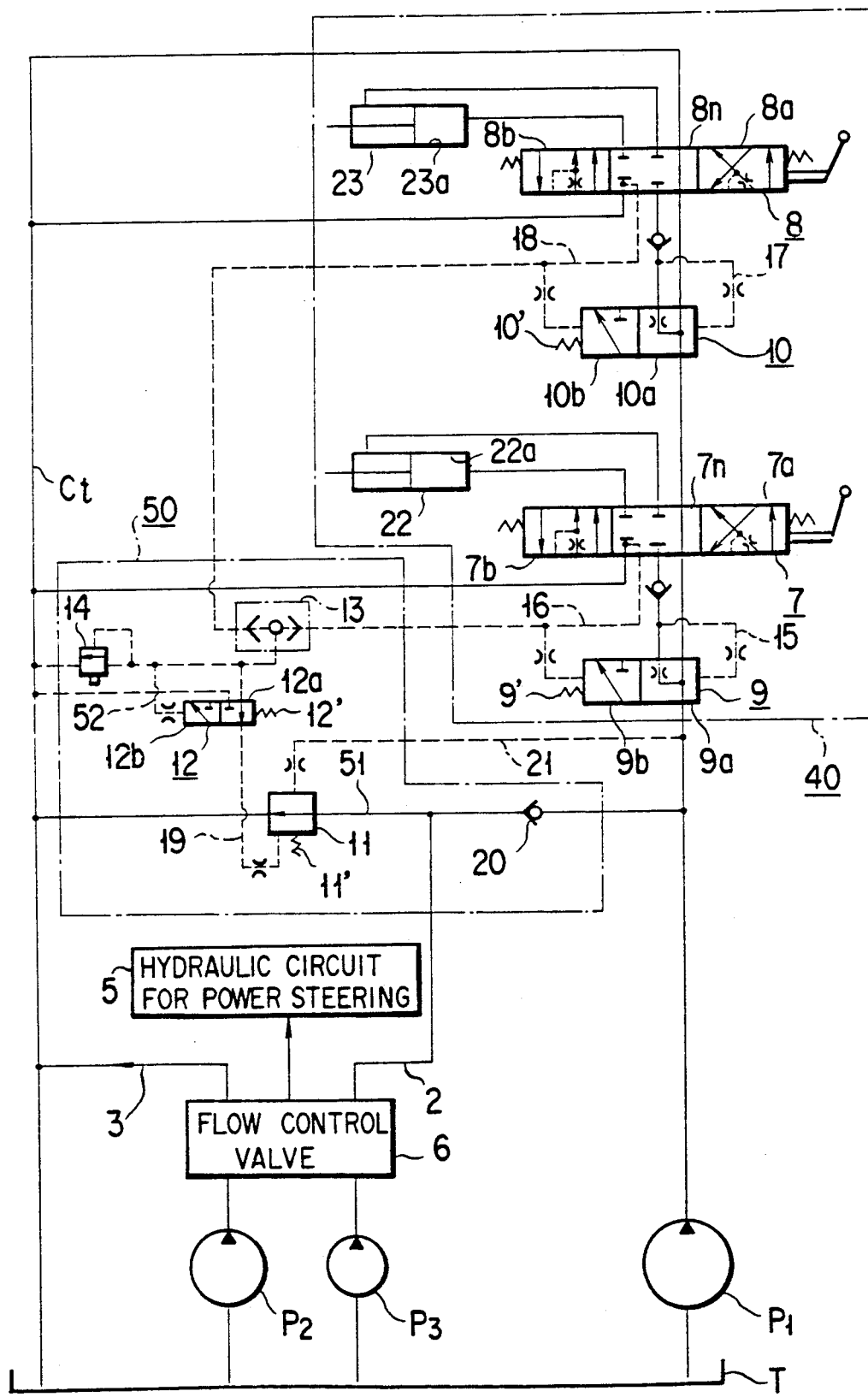
FIG. 4 is a schematic explanatory view showing the construction of one embodiment of the present invention.

In FIG. 4 showing the first embodiment of the present invention, a hydraulic circuit 40 for implements comprises a first implement operating valve 7 and a second implement operating valve 8 which are provided with a first pressure compensating flow control valve 9 and a second pressure compensating flow control valve 10, respectively. The pressure compensating flow control valves 9 and 10 supply pressurized fluid into the implement operating valves 7 and 8, respectively, in accordance with the manipulated variable of the valves 7 and 8, respectively. The hydraulic cylinders 22 and 23 for driving implements can then be controlled by the implement operating valves 7 and 8, respectively. The first pressure compensating flow control valve 9 changes from its unloading position 9a over to its loading position 9b under the action of a differential pressure between the pressure downstream of the first pressure compensating flow control valve 9, led by way of a pilot conduit 15, and the pressure downstream of the first implement operating valve 7 led by a pilot conduit 16. Further, the second pressure compensating flow control valve 10 changes in the same manner from its unloading position 10a over to its loading position 10b under the action of a differential pressure between the pressure downstream of the second pressure compensating flow control valve 10, led by way of a pilot conduit 17, and the pressure downstream of the implement operating valve 8, led by way of a pilot conduit 18.

Reference character $P_1$ denotes a first hydraulic pump for supplying pressurized fluid for exclusive use by the implements. The pressurized fluid delivered by the hydraulic pump $P_1$ is supplied by way of a first supply conduit 1 into a hydraulic circuit 40 for implements. Further, reference characters $P_2$ and $P_3$ denote a second hydraulic pump and a third hydraulic pump for supplying pressurized fluid through a flow control valve 6 to a second supply conduit 2 and a third supply conduit 3, respectively and also into the hydraulic circuit 5 for power steering and the hydraulic circuit 40 for implements.

Next, a surplus pressurized fluid control circuit 50 will be described.

The first and second pilot conduits 16 and 18 of the first and second pressure compensating flow control valves 9 and 10 operating valves 7 and 8 are connected to load pressure chambers 22a and 23a, respectively, of the hydraulic cylinders 22 and 23 for driving implements.

Further, a pilot actuated type unloading valve 11 is provided in a surplus pressurized fluid supply conduit 51, which is connected through a check valve 20 to first supply conduit 1. The first supply conduit 1 connects the hydraulic pump $P_1$ with the first pressure compensating flow control valve 9 21. It is also subjected to a drain conduit Ct. This pilot actuated type unloading valve 11 serves either to allow the surplus pressurized fluid from the above-mentioned second and third hydraulic pumps $P_2$ and $P_3$ to flow through the flow control valve 6 and through the third supply conduit 3 into the hydraulic circuit 40 for implements, or to unload the surplus fluid into the drain conduit Ct. The check valve 20 is connected to the surplus pressurized fluid conduit 51 which is connected between the first and third supply conduits 1 and 3.

The above-mentioned pilot actuated type unloading valve 11 is subjected at one end with the pressure downstream of the check valve 20 which is led by a third pilot conduit. The supply conduit 51 is also connected to the pressures within the first and second pilot conduits 16 and 18 of the first and second pressure compensating flow control valves 9 and 10, respectively, which are led through a shuttle valve 13 and a fourth pilot conduit 19.

This fourth pilot conduit 19 is provided with a pilot pressure change-over valve 12. A pilot pressure drainage conduit 52 is connected through a pilot relief valve 14 connected between the above-mentioned shuttle valve 13 and the drain conduit Ct.

The operation of the hydraulic circuit apparatus of the present invention having the above-mentioned arrangement will be described below.

(1) First when both the implement operating valves 7 and 8 are located at their neutral positions 7n and 8n, respectively, as shown in FIG. 4.

The pressure compensating flow control valves 9 and 10 assume their unloading positions 9a and 10a, respectively, since their springs 9' and 10' are pushed by the pilot fluid pressure delivered by the first hydraulic pump $P_1$ through the pilot conduits 15 and 17, respectively.

In the same manner as the pressure compensating flow control valves 9 and 10, the pilot actuated type unloading valve 11 also assumes its unloading position, as shown in FIG. 4. Thus, since the pressure for actuating the pressure compensating flow control valves 9 and 10 and the pilot actuated type unloading valve 11 is determined by the amount of pressurized fluid discharged by the pump $P_1$ and kept at a low value, pressure losses are small.

(2) Next, when the amount of the fluid discharged by the first hydraulic pump $P_1$ is sufficient to cover the total flow rate of the fluid under pressure required by the implement operating valves 7 and 8.

The pressure compensating flow control valves 9 and 10, associated with the implement operating valves 7 and 8 manipulated by the operator act to allow the pressurized fluid discharged by the hydraulic pump $P_1$ to flow partially into the implements hydraulic circuit 40 implements at a flow rate required by the implement operating valves 7 and 8. Then, the differential pressure between the pressure downstream of the implement operating valves and 8 led by the fourth pilot conduit 19 and the pressure in the third pilot 21 has not yet dropped to such a value as to allow extension of a spring 11' mounted in the unloading valve 11. Therefore, the pilot actuated type unloading valve remains unloading the surplus fluid under pressure from the second and third hydraulic pumps $P_2$ and $P_3$. As a result, only the pressure discharged by the hydraulic pump $P_1$ is loaded in the implements hydraulic circuit 40 so that the power consumption by the hydraulic pump is kept low.

(3) Third, when the amount of the fluid discharged by the first hydraulic pump $P_1$ is insufficient to cover the total flow rate of the fluid under pressure required by the implement operating valves 7 and 8.

The differential pressure between the pressure in the third pilot conduit 21 and that in the fourth pilot conduit 19 becomes lower than the resilient force of the spring 11'. As a result, the pilot actuated type unloading valve 11 is shut off so as to allow the surplus pressurized fluid from the hydraulic pumps $P_2$ and $P_3$, which is originally supplied into the hydraulic circuit 5 for power steering, to flow into the implements hydraulic circuit 40 by a flow rate which corresponds to the shortage in the amount of the fluid discharged by the hydraulic pump $P_1$. Consequently, the pressure in the implements hydraulic circuit 40 is increased, and in case the fluid pressure in the pilot pressure drainage conduit 52 overcomes the resilient force of a spring 12' mounted in the pilot pressure change-over valve 12, the latter is changed from its loading position 12a as shown over to its unloading position 12b. This shuts off the pilot fluid under pressure from the fourth pilot conduit 19 and drains the pressurized fluid in the chamber of the unloading valve 11 in which the spring 11' is mounted into the fluid tank or reservoir T. As a result, the spring 11' of the pilot actuated type unloading valve 11 is urged or compressed by the pressure prevailing in the pilot conduit 21 so as to drain or unload all the surplus pressurized fluid supplied through the third supply conduit 3 by the second and third hydraulic pumps $P_2$ and $P_3$ into the fluid tank T. Accordingly, when the implements hydraulic circuit 40 is kept at a high pressure, only the pressure discharged by the first hydraulic pump $P_1$ is loaded in the implements hydraulic circuit 40 regardless of the amount of manipulation or the manipulated variable of the implement operating valves 7 and 8. Therefore the power consumption by the pumps is kept low.

As is obvious from the foregoing description, the surplus pressurized fluid control circuit 50 forms the main point of the hydraulic circuit apparatus of the present invention.

Further, reference numerals 7a and 8a denote operative positions of the implement operating valves 7 and 8, respectively, and numerals 7b and 8b denote returning or inoperative positions thereof.

The above-mentioned operating conditions in FIG. 4 is summarized in FIG. 5.

Figure 6:
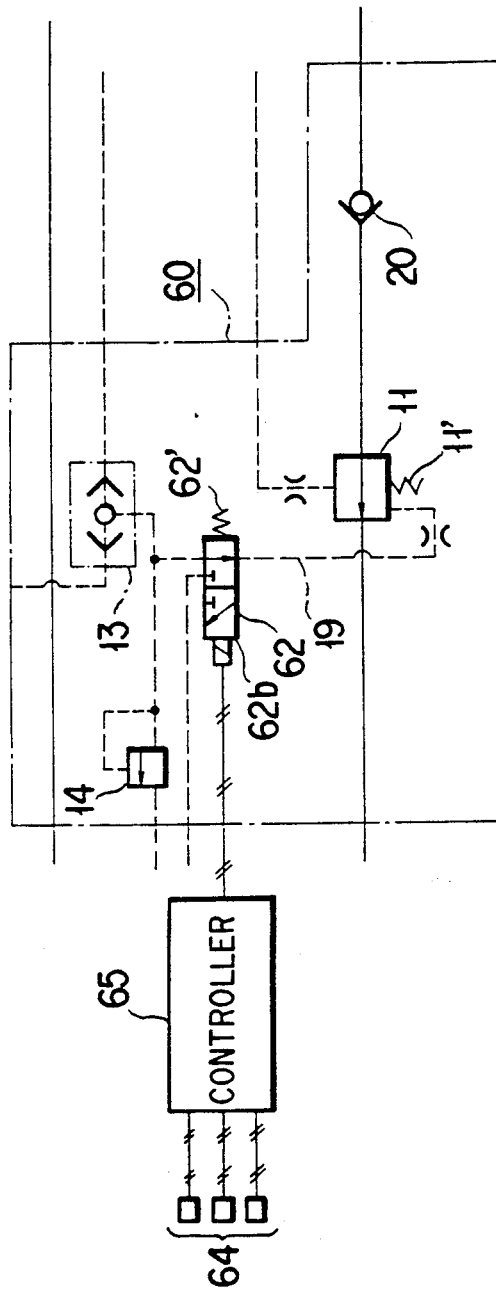
FIG. 6 is a schematic, constructional explanatory view showing principle parts of another embodiment of the present invention.

FIG. 6 is another embodiment of the present invention wherein the surplus pressurized fluid control circuit 50 and the pilot pressure change-over valve 12 shown in FIG. 4 are replaced with a solenoid actuated type surplus pressurized fluid control circuit 60 and a solenoid actuated type pilot pressure change-over valve 62, respectively. Reference numeral 64 denotes a detector adapted to detect input data on conditions such as, for example, the fluid pressure in the implements hydraulic circuit 40 shown in FIG. 4 and to change the pilot actuated type unloading valve 11 from its loading position over to its unloading position 62b. A controller 65 is adapted to output a signal for changing over the detector 64. These detectors are not shown in FIG. 4.

What is claimed is:

1. A hydraulic circuit apparatus for use in construction vehicles including a hydraulic circuit for power steering and a hydraulic circuit for work implements having at least two hydraulic actuators, wherein an arrangement is made such that pressurized fluid in excess of that required in the hydraulic circuit for power steering is allowed to join the fluid supplied into the hydraulic circuit for work implements, characterized in that said hydraulic circuit apparatus comprises a plurality of pressure compensating flow control valves controlling the flow rate of the pressurized fluid supplied into a plurality of implement operating valves, respectively, of the hydraulic circuit for work implements, and a pilot actuated type unloading valve controlling the flow rate of the pressurized fluid when the remainder of pressurized fluid supplied into the hydraulic circuit for power steering is supplied into the hydraulic circuit for work implements and further characterized in that a pilot pressure change-over valve responsive to a control pressure of one of said plurality of pressure compensating flow control valves is provided in a pilot piping connected to said pilot actuated type unloading valve controlling the flow rate of the fluid under pressure when the remainder of pressurized fluid supplied into the hydraulic circuit for work implements so that the hydraulic pressure within the pilot piping is changed over so as to unload said pilot actuated type unloading valve when the hydraulic pressure within the pilot piping exceeds a preset value.

2. A hydraulic circuit apparatus for use in construction vehicles including a hydraulic circuit for power steering and a hydraulic circuit for work implements having at least two hydraulic actuators, wherein an arrangement is made such that pressurized fluid in excess of that required in the hydraulic circuit for power steering is allowed to join the fluid supplied into the hydraulic circuit for work implements, characterized in that said hydraulic circuit apparatus comprises a plurality of pressure compensating flow control valves controlling the flow rate of the pressurized fluid supplied into a plurality of implement operating valves, respectively, of the hydraulic circuit for work implements, and a pilot actuated type unloading valve controlling the flow rate of the pressurized fluid when the remainder of pressurized fluid supplied into the hydraulic circuit for power steering is supplied into the hydraulic circuit for work implements,
wherein said pilot actuated type unloading valve is subjected to a pressure from one of said pressure compensating flow control valves and a pressure in said hydraulic circuit for said work implements.

3. A hydraulic circuit apparatus for use in construction vehicles as claimed in claim 2,
wherein each of said pressure compensating flow control valves is subjected to a pressure downstream of the respective pressure compensating flow control valve and to a pressure downstream of the respective implement operating valve.

4. The hydraulic circuit apparatus for use in construction vehicles as claimed in claim 2, wherein said pilot actuated type unloading valve is subjected to said pressure from one of said pressure compensating flow control valves through a shuttle valve and a pilot pressure change-over valve.

* * * * *